United States Patent [19]

Alstig

[11] Patent Number: 4,750,292

[45] Date of Patent: Jun. 14, 1988

[54] PLANT GUARD AND A METHOD AND MACHINE FOR ITS MANUFACTURE

[75] Inventor: Mauritz Alstig, Östersund, Sweden

[73] Assignee: Strumpfabriken Vinetta Aktiebolag, Östersund, Sweden

[21] Appl. No.: 37,124

[22] Filed: Apr. 10, 1987

Related U.S. Application Data

[63] Continuation of Ser. No. 752,374, Jul. 5, 1985, abandoned.

[30] Foreign Application Priority Data

Jul. 5, 1984 [SE] Sweden ............................... 8403576

[51] Int. Cl.⁴ ....................... A01G 13/10; B65D 30/00
[52] U.S. Cl. ........................................ 47/30; 383/37; 383/72; 47/78
[58] Field of Search ................... 47/84, 73, 56, 74, 9, 47/76, 20, 21, 28 R, 29-31, 78; 53/567, 390; 294/68.21; 206/423; 150/52 R; 383/72, 76, 37, 117, 75

[56] References Cited

U.S. PATENT DOCUMENTS

| | | | |
|---|---|---|---|
| Re. 14,318 | 6/1917 | Hayashi | 206/423 X |
| 735,217 | 1/1959 | Robbins | 47/84 |
| 1,807,819 | 6/1931 | Altgelt | 294/68.21 |
| 1,894,506 | 1/1933 | Wilson | 47/73 |
| 1,926,053 | 9/1933 | Morgan . | |
| 1,988,886 | 1/1935 | Wilson . | |
| 2,989,828 | 6/1961 | Warp | 47/84 |
| 3,184,890 | 5/1965 | McKey | 47/73 |
| 3,322,176 | 5/1967 | Geller | 383/72 X |
| 3,380,220 | 4/1968 | Jennings et al. | 47/84 |
| 3,662,490 | 5/1972 | Childs | 47/73 |
| 3,709,263 | 1/1973 | Jackson et al. | 47/73 |
| 3,788,003 | 1/1974 | Creighton et al. | 47/56 |
| 4,006,561 | 2/1977 | Thoma et al. | 47/84 |
| 4,016,678 | 4/1977 | Larsen | 47/77 |
| 4,091,925 | 5/1978 | Griffo et al. | 206/423 |
| 4,109,442 | 8/1978 | Maasbach | 47/76 |
| 4,170,097 | 10/1979 | Floct et al. | 53/567 |
| 4,333,265 | 6/1982 | Arnold | 47/74 |
| 4,357,884 | 11/1982 | Rast | 47/9 |

FOREIGN PATENT DOCUMENTS

| | | | |
|---|---|---|---|
| 209796 | 6/1960 | Austria | 383/117 |
| 39115 | 11/1981 | European Pat. Off. | 423/ |
| 114798 | 8/1984 | European Pat. Off. | 47/76 |
| 1804926 | 5/1970 | Fed. Rep. of Germany | 206/423 |
| 7632821 | 12/1977 | Fed. Rep. of Germany . | |
| 2948265 | 5/1981 | Fed. Rep. of Germany | 206/423 |
| 633293 | 1/1928 | France . | |
| 8005568 | 5/1982 | Netherlands | 47/76 |
| 8203460 | 4/1984 | Netherlands | 47/84 |

OTHER PUBLICATIONS von Essen, Carl, "Nagot alldeles extra mot snytbaggen" Skogen, 1983, No. 7, pp. 40-41.

Primary Examiner—Robert A. Hafer
Assistant Examiner—Danton D. DeMille
Attorney, Agent, or Firm—Nils H. Ljungman

[57] ABSTRACT

A plant guard for protecting plants against pest attack. The guard (10) comprises a knitted hose-like net structure which is intended to form a casing around the guard. Connected to the bottom part (13) of the net structure are mutually crossing hang-threads (14) which form the bottom of the guard. A closure thread (17) is located at the other end of the net structure, this thread when tightened gathering together the upper part of the guard. The closure thread (17) is knitted integrally with the net structure and comprises a thread of high surface friction, so as to be self-locking when tension is released. At least one loop (18) formed from the closure thread is attached to the bottom end (15) of an adjacent, corresponding plant guard, such that the closure thread (17) is drawn together when the two plant guards are separated one from the other. The application also describes a method and a circular knitting machine for manufacturing such a plant guard.

17 Claims, 2 Drawing Sheets

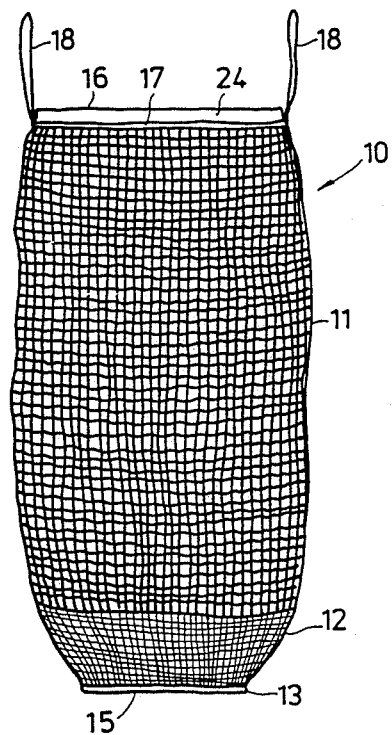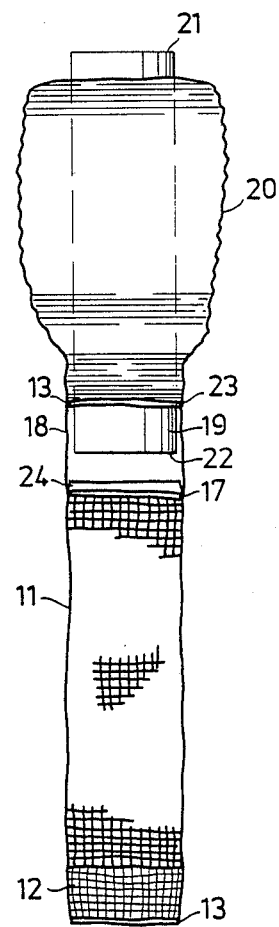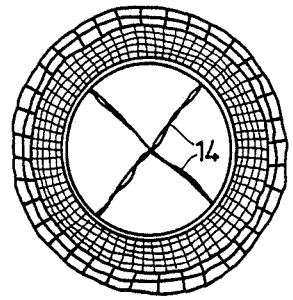

PLANT GUARD AND A METHOD AND MACHINE FOR ITS MANUFACTURE

This application is a continuation of U.S. application Ser. No. 752,374, filed on July 5, 1985, now abandoned.

CROSS REFERENCE TO CO-PENDING APPLICATION

Co-pending application Ser. No. 833,506, filed on Feb. 20, 1986 U.S. Pat. No. 4,706,411, entitled "Plant Guard", which is a continuation application of Ser. No. 572,934, filed on Jan. 20, 1984 now abandoned, also entitled "Plant Guard", corresponding to Swedish Patent Application No. 8300313-7, filed on Jan. 21, 1983, is assigned to the same assignee as the instant application and is incorporated herein by reference as if the text thereof was fully set forth herein.

BACKGROUND OF THE INVENTION

1. Field of the Invention

The present invention relates to a plant guard which is intended to protect a plant against attack by pests and which comprises a knitted hose-shaped net which is intended to form a casing around the plant; hang threads attached to one end of the net and forming the bottom thereof; and a net-closure thread provided at the other end of the net for gathering together the upper part of the guard. The invention also relates to a method and a machine for producing such plant guards.

2. Description of the Prior Art

It is a generally recognized problem that newly planted plants are often attacked by different types of pest, particularly insects. For example, the forestry industry suffers large economic losses each year as a result of attack by pine weevil and other pathogenic insects for example. Since the use of chemical sprays is often ineffective in controlling such pests, and indeed often unsuitable with respect to the health hazards involved and to the environmental harm caused, various mechanical guards have been developed. One such guard is described in European Patent Application No. 84850020.3, published under Ser. No. 0114798. The guard comprises a net structure which is intended to enclose a newly planted plant, either totally or partially, and which decomposes when the plant has grown and become more durable, and ultimately disappears completely. The guards are applied to respective plants manually, by inserting the plants into a tube onto which a number of guards have been mounted. When a plant is drawn out of the tube, the plant engages bottom threads located on the lowermost guard and extending transversely of the outlet orifice of the tube, therewith to entrain the guard with the plant. The upper part of the guard is then gathered around the plant with the aid of a tie, which is tied manually around the plant, whereafter the plant is ready for planting.

Such plant guards have been found highly effective against attack from pine weevil and other pathogenic insects, but because the task of manually gathering and tying the guard is relatively time-consuming, the use of such guards on a large scale is often found too costly to be viable.

OBJECTS OF THE INVENTION

Consequently one object of the present invention is to provide a plant guard in the form of a hose-like net structure such that successive nets can be placed over a succession of plants in a progressive planting operation in a simple and rapid fashion. Other objects are to provide a method and a machine for producing such plant guards in an economic and operationally reliable manner. These objects together with further objects of the invention and advantages afforded thereby will be apparent from the following description, and are achieved with a plant guard having the characteristic features set forth in the claims.

BRIEF DESCRIPTION OF THE DRAWINGS

The invention will now be described in more detail with reference to the accompanying drawings, in which FIG. 1 is a side view of a plant guard according to the present invention;

FIG. 2 is a view shown from beneath the plant guard illustrated in FIG. 1;

FIG. 3 is a side view illustrating schematically a plurality of plant guards threaded onto a storage and applicator tube, and shows a plant guard hanging freely from the tube;

DESCRIPTION OF THE PREFERRED EMBODIMENTS

Figure 4:
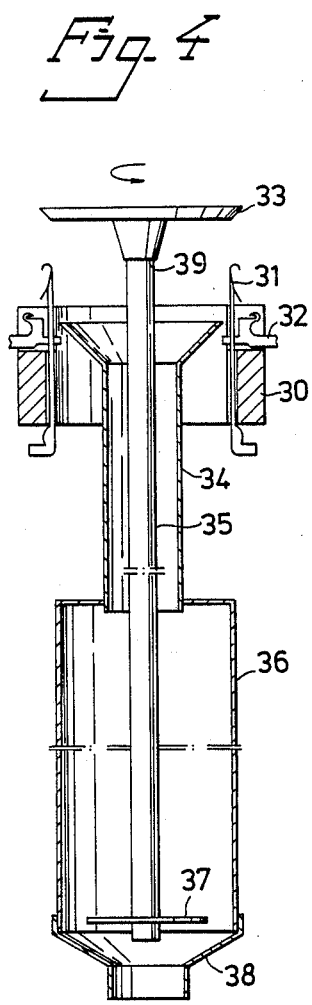
FIG. 4 is a cross-sectional schematic view of a circular knitting machine for manufacturing the plant guard illustrated in FIG. 1.

The plant guard 10 according to FIG. 1 comprises a knitted hose-shaped net structure which is intended to form a casing around the root-parts of a plant and the stem and lateral growths thereof. The net structure includes a main part 11 which is knitted with a polyamide thread or like synthetic thread which is highly resistant to ultraviolet radiation, and a lower part 12 which is knitted with a cotton thread. When planting a plant, the root part of the plant will be encased in the lower net part 12, while most of the main net part 11 will be located above the soil. The net is terminated with a bottom part 13 comprising knitted elastomeric thread. In the course of knitting the sleeve structure, a plurality of hang-threads 14 are caused to extend diametrically across the bottom end 15 of the guard, therewith to form the bottom thereof. At the opposite end 16 of the guard and knitted integrally with the main net part 11 is a closure tie 17. The properties of the closure tie should be such as to enable it to pass readily through threading eyelets when the tie is stretched, but to render it self-locking when tension is released. A crimped polyamide thread, for example 1/78 denier nylon, has been found to be suitable for this purpose. The closure tie or thread is knitted so as to form at least one, preferably two extended loops 18. The elastomeric threads in the bottom part 13 of an adjacent plant guard 23 are intended to pass through these loops. The upper end 16 of the guard is terminated with a number of knitted rows of covered elastomeric thread, so as to provide an effective lock against unravelling of the stitches in the net-closure part.

The plant guards are suitably mounted for delivery on a storage and applicator tube 19, a tube of 50 cm in length being capable of carrying and storing one hundred plant guards 20. When performing a planting operation, a plant is introduced into an upper inlet orifice 21 and allowed to fall down through the tube, until caught by the cruciform constituted by the hang threads 14.

The plant is then pulled down, out of the tube, so as to entrain therewith the lowermost plant guard 10, which is thus drawn out around the plant, as illustrated in FIG. 3. At this stage of the proceedings, the plant guard and the plant are together suspended from the harness-like loops 18, and when the guard is pulled down still further, while holding the next plant guard 23 in line stationary, the closure thread 17 will draw the upper end 16 of the net structure together, until it is fully gathered over or around the enclosed plant. The closure threads 17 comprises a material which is stronger in tension than the thread used in the bottom end 15 of the guard, and hence the loops 18 will tear-off the elastomeric threads extending therethrough at the bottom end of the guard. The tightened upper end of the guard becomes self-locking, since the crimped polyamide thread is self-contracting when the load on the loops is removed, and since the threads knitted in the final row 24 comprise a covered elastomeric thread which is self-locking in itself, the last row cannot be further unravelled, despite the fact that one thread has been drawn out. During this sequence of events, the next guard 23 in line has been drawn down to an extent such that its hang-threads 14 now cross the exit orifice 22, thereby enabling the next plant to be fitted with a corresponding plant guard with no time lost, and so on. It has been found in practice that a plant guard according to the invention can be applied to a plant in just 20-30% of the planting time required by the earlier known plant guard with which the closure thread is tightened manually.

Figure 5:
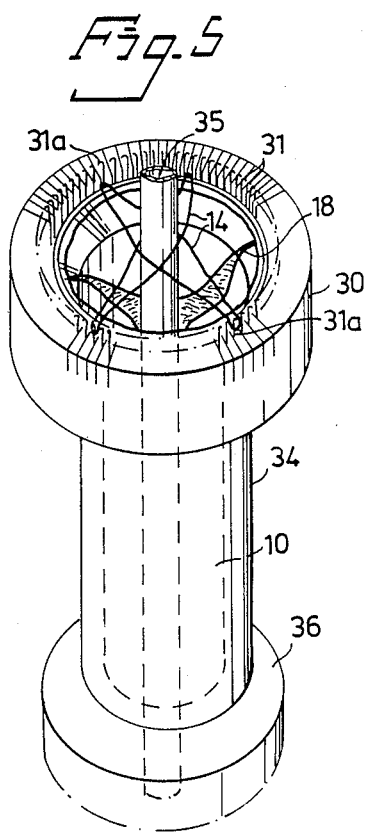
FIG. 5 is a perspective view.
Figure 6:
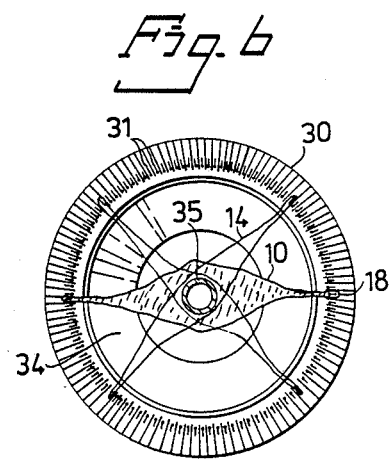
FIG. 6 is a view from above the knitting cylinder incorporated in the knitting machine of FIG. 4.

A knitting machine for producing a plant guard according to the invention is illustrated in FIGS. 4-6. The machine is a modified circular knitting machine of the kind used, for example, for knitting stockings. The machine comprises conventionally a knitting cylinder 30 provided with knitting needles 31 and sinker means 32. A dial plate 33 is arranged to sever the knitting thread when changing to a new type of thread. During a knitting operation the knitting cylinder 30 and the dial plate 33 rotate about an external tube 34 in a conventional manner. The plant guards are manufactured in a continuous sequence, the guards being mutually connected together by means of respective loops 18. For the purpose of guiding and collecting the successively produced plant guards a guide tube 35 is arranged centrally in the outer tube 34, and extends through the knitting cylinder 30 up to the dial plate 33. The guide tube 35 is suspended from the dial plate with the aid of a coupling 39 so arranged that the guide tube rotates at the same speed as the dial plate, and therewith the knitting cylinder. The guide tube opens into a collecting housing 36 which is placed under a given sub-pressure, so as to successively draw down by suction the knitted plant guards located around said guide tube. The plant guards move down against a rubber plate and subsequent to manufacturing a given number of guards, for example one hundred guards, the knitting machine is stopped and a removable bottom 38 removed from the collecting housing together with the rubber plate 37, so as to enable the guards to be drawn from the guide tube and collected on the storage and applicator tube 19. The diameter of the tube 19 is greater than that of the guide tube, and hence the guards are suitably transferred with the aid of a conical transfer device (not shown), to simplify handling of the plant guards.

A suitable method for manufacturing the plant guard will now be described. As previously mentioned, the plant guards are produced continuously in a hose-like sequence in a circular knitting machine of the aforedescribed kind. Knitting of each individual guard commences with the bottom part 13, there being first knitted an inlay incorporating about three rows of thread in the bottom part of the guard. This thread suitably comprises a covered elastomeric thread, for example a thread retailed under the designation LYCRA. Knitting then continues with a conventional stocking stitch for about three rows, the inlay being stitched in so as to be incorporated in a further row. The hang-threads 14 are then stitched, this being effected by lifting solely two mutually opposite knitting needles 31a to take thread, while holding all remaining needles in a lowered position. From two to four rows are suitably knitted in this way. These needles are then drawn down while two other needles displaced through 90° with respect to the previously mentioned needles are lifted to take thread for a corresponding number of rows, so as to form a cruciform bottom part. Knitting is suitably effected in at least two stitching systems around the guide tube 35, so that the tube is located in the centre of the cruciform, as shown in FIGS. 5 and 6. This facilitates guiding of the plant guards along the tube 35 and the transfer of said guards to the storage and applicator tube 19. Knitting is then continued with a conventional stocking stitch for at least three rows with the same elastomeric thread.

The bottom part 13 of the net is now completed and knitting continues with the lower part 12 of the guard. This part of the guard is preferbly knitted in a thread which will dissolve relatively quickly in the ground, so that the root system of the plant is able to develop unhindered. The thread used is suitably an untreated and unbleached cotton thread having a thickness Ne of 50/1-60/1. The cotton thread is knitted in conventional stocking stitch for from ten to fifteen rows, i.e. two to three centimeters. The main part 11 of the guard is then knitted, suitably using a highly durable yarn, particularly a yarn which can withstand ultraviolet radiation, so that the yarn remains intact for at least the first four years. It should be ensured, however, that the yarn or thread is not excessively coarse or the stitches excessively tight so as to unnecessarily prevent photosynthesis. Suitably there is chosen a smooth polyamide thread, for example a 1/50 denier nylon. Knitting is suitably effected in the so-called micromesh knitting mode, which provides a suitable loop form and an elastic net. The length of the main part of the guard is adapted to the size of the plants to be planted and consequently is normally from 15-40 cm.

When the main part of the net has been completed, the closure thread is stitched together therewith. As before-mentioned, the yarn used for the closure thread shall possess properties which enable it to pass readily through knitting eyes when stretched and which render the thread self-locking when tension is removed. Crimped polyamide thread has been found a suitable yarn in this respect. The tensile strength of the thread shall greatly exceed that of the thread in the bottom part 30 of the guard, so that the loops 18 are not torn apart during planting work. An example of suitable thread in this respect is 1/78 denier nylon. Distinct from the main part of the plant guard and the lower part thereof, the closure thread is knitted with solely one system and commences with stocking stitch for one row, whereafter two knitting needles are drawn down in the knitting cylinder and take therewith two loops, to remain in this position until the next knitting sequence is ready. A further two, three rows of closure thread are drawn through the loops in the first knitted row, whereafter the last row 24 is suitably knitted with a covered elastomeric thread, for example a thread of the same kind used in the bottom part of the guard. A single knitting system is also used in this respect, because the loops 18 would otherwise be dropped, since the second knitting system is used to couple said loops. This assumes that the machine only has two knitting systems. Stitching is terminated subsequent to knitting three to six rows, although the downwardly drawn needles are held in their lowered positions. Manufacture of the next plant guard then begins in the same manner, with an introductory stage, whereafter all needles are lifted, including the two downwardly drawn needles, and knitting commences, the knitting thread extending through the two loops 18. FIGS. 5 and 6 illustrate the manufacturing stage in which the hang-threads in the next following guard are newly produced. Stitching then continues in the aforedescribed manner.

It will be understood that the invention is not restricted to the aforedescribed embodiment and that modifications can be made within the scope of the following claims.

I claim:

1. A plurality of plant guards attached together in a sequence, each plant guard being adapted to protect a plant against attack by pests and each comprising:
   a knitted hose-shaped net structure adapted to form a protective casing around the plant when expanded, said hose-shaped net structure having a lower portion for enclosing the root structure of the plant and an upper portion for enclosing the remainder of the plant;
   hanging thread means located near the terminal end of said lower portion for engaging the root structure of the plant;
   closure thread means located near the terminal end of said upper portion for, when activated, gathering together and substantially closing the terminal end of said upper portion; and
   interconnecting thread means, disposed between said plant guard and an adjacent plant guard and connecting said adjacent one of said plant guards in said sequence of said plurality of plant guards, said interconnecting thread means integrally connected to said closure thread means for activating said closure thread means upon separation of the interconnected thread means from an adjacent plant guard from said sequence of plant guards.

2. The plurality of plant guards according to claim 1, wherein said closure thread means of said plant guard comprises a crimped synthetic fibre thread.

3. The plurality of plant guards according to claim 1, wherein said net structure comprises a main part knitted from polyamide thread and adapted to, when planted, be located substantially above the soil line; a lower part knitted from cotton thread and adapted to, when planted, be substantially located beneath the soil line; and a bottom part including said hanging thread means and comprising an elastomeric material.

4. The plurality of plant guards according to claim 1, wherein said hanging thread means comprises at least one thread spanning the terminal end of said lower portion of said hose-shaped net structure and being fastened to diametrically opposed portions thereof.

5. The plurality of plant guards according to claim 1, wherein said plant guard has a predetermined length when extended and a predetermined width when extended, said length being greater than said width.

6. The plurality of plant guards according to claim 1, wherein said closure thread means comprises a crimped polyamide thread.

7. The plurality of plant guards according to claim 1, wherein said closure thread means of said plant guard comprises a closure thread integrally knitted with said upper portion of said net structure, wherein said interconnecting thread means of said plant guard comprises at least one loop of said closure thread encircling and interlocking with interlocking threads located in the lower portion of the net structure of an adjacent, following plant guard, and wherein the tensile strength of said interconnecting thread is less than the tensile strength of said interlocking threads located at the lower portion of the net structure of said adjacent, following plant guard, such that separation of said plant guard from said sequence of plant guards initially produces a tractable force on said integrally knitted closure thread to thereby gather and substantially close said upper portion of said net structure, followed by rupture of said interconnecting threads at the lower portion of the adjacent following plant guard.

8. The plurality of plant guards according to claim 7, wherein said interlocking threads of the adjacent following plant guard comprise an elastomeric material.

9. The plurality of plant guards according to claim 7, wherein said closure thread means includes self-locking means for maintaining said terminal end of said upper portion in a substantially closed state.

10. The plurality of plant guards according to claim 9, wherein said closure thread means comprises a crimped polyamide thread.

11. The plurality of plant guards according to claim 9, wherein said interlocking threads of the adjacent following plant guard comprise an elastomeric material.

12. The plurality of plant guards according to claim 1, wherein said closure thread means includes self-locking means for maintaining said terminal end of said upper portion in a substantially closed state.

13. The plurality of plant guards according to claim 12, wherein said closure thread means of said plant guard comprises a crimped synthetic fibre thread.

14. The plurality of plant guards according to claim 13, wherein said net structure comprises a main part knitted from polyamide thread and adapted to, when planted, be located substantially above the soil line; a lower part knitted from cotton thread and adapted to, when planted, be substantially located beneath the soil line; and a bottom part including said hanging thread means and comprising an elastomeric material.

15. The plurality of plant guards according to claim 12, wherein said hanging thread means comprises at least one thread spanning the terminal end of said lower portion of said hose-shaped net structure and being fastened to diametrically opposed portions thereof.

16. The plurality of plant guards according to claim 12, wherein said plant guard has a predetermined length when extended and a predetermined width when extended, said length being greater than said width.

17. The plurality of plant guards according to claim 12, wherein said closure thread means comprises a crimped polyamide thread.

* * * * *